Patented Oct. 24, 1922.

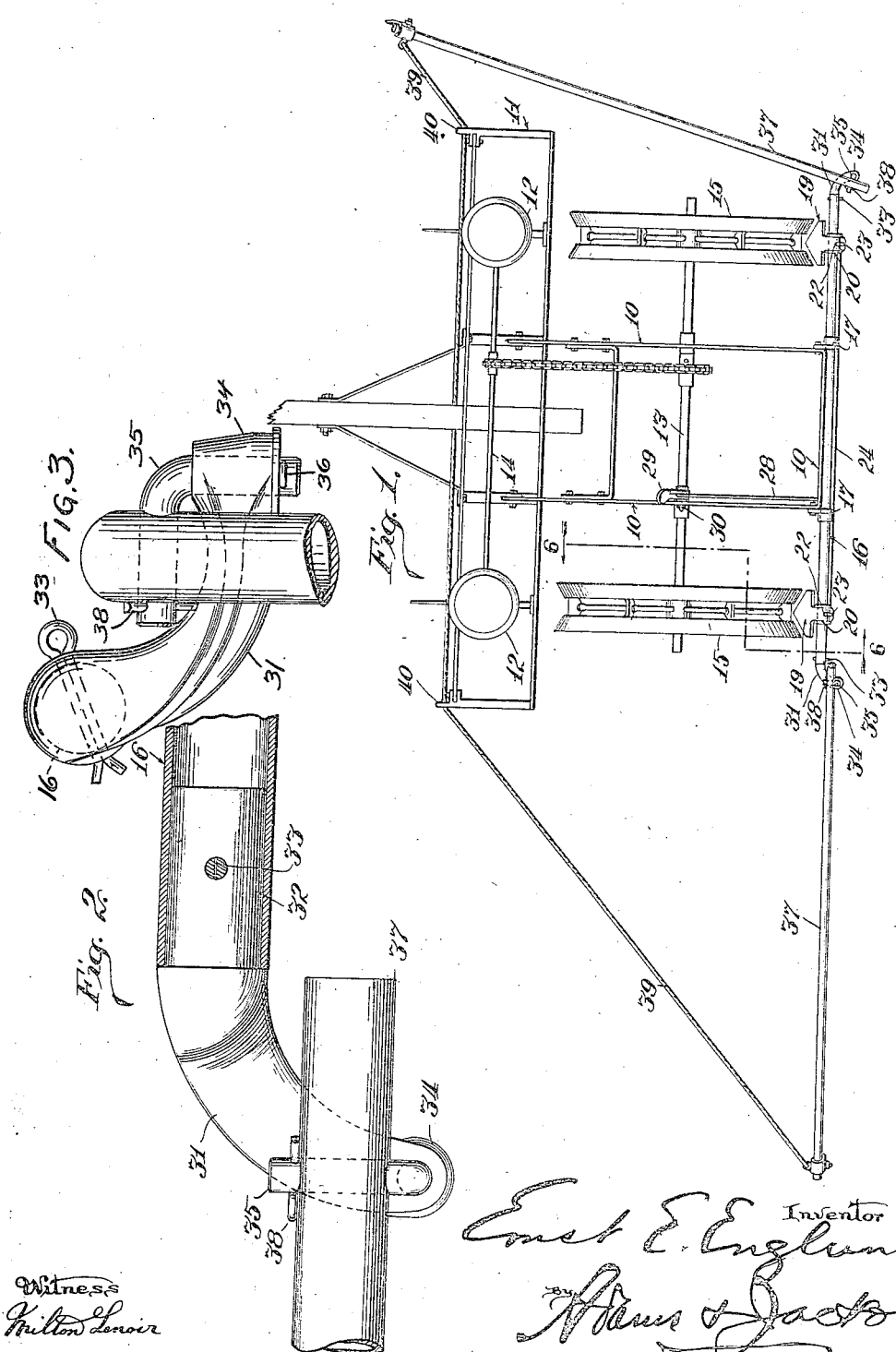

1,432,986

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

LAND MARKER FOR PLANTERS.

Application filed October 17, 1921. Serial No. 508,363.

*To all whom it may concern:*

Be it known that I, ERNST E. ENGLUND, a citizen of the United States, and a resident of Moline, in the county of Rock Island and State of Illinois, have invented certain new and useful Improvements in Land Markers for Planters, of which the following is a specification, reference being had to the accompanying drawings.

This invention relates to that class of land marking devices that comprises two marker arms pivotally connected with a planter at opposite sides of the rear portion thereof, the outer ends of such arms being connected together by a flexible connection that passes around suitable guides at the front end of the planter and is of such length as to compel one of said arms to lie in inoperative position alongside of the planter when the other arm is in its extended operative position.

The invention has for its object to provide improved means for so securing the said marker arms that they will be free to rise and fall when in operation as may be necessary, on account of the unevenness of the surface of the ground, and will be guided by the devices to which they are severally attached into operative and inoperative position. This object I accomplish by the construction and arrangement of parts shown in the drawings and hereinafter described. That which I believe to be new will be pointed out in the claims.

In the drawings:

Fig. 1 is a top or plan view of a corn-planter in which my improvements are embodied, certain parts of the planter being omitted, as not necessary to an understanding of the present invention;

Fig. 2 is a detail, being a top or plan view showing the means for movably connecting the inner end of one of the marker arms with an end of the scraper-carrying bar,—the portion of the scraper-carrying bar shown being in section;

Fig. 3 is a view showing in end elevation the means for connecting a marker arm in place a portion only of the marker arm being shown.

Referring to the several figures of the drawings,—10 indicates an ordinary rear frame of a corn planter of approximately rectangular shape as usual, and at its front end connected in any ordinary manner with a front frame 11 in which latter frame are supported seed boxes 12 that will be provided with the usual seed measuring and discharging devices in their lower ends. 13 indicates the axle of the machine, upon which the main frame 10 is mounted, and from which axle a shaft 14 that is connected with the seed discharging mechanism in the bottoms of the seed boxes is driven in the usual manner. The supporting wheels of the machine that are secured upon the axle 13 are indicated by 15. The corn planter as a whole may be of any well known type, and as in and by itself it forms no part of my present invention, a further description of such machine is not deemed necessary.

16 indicates a scraper-carrying bar at the rear of the main frame 10, which is secured rigidly to such main frame. In the construction shown this bar is secured in place by passing through two brackets 17 that depend from the side bars of the main frame, and are bolted to such side bars. The bar 16 is cylindrical in shape, in order to permit the free rotation thereon of the scrapers hereinafter referred to, and inasmuch as the bar itself should be held against rotation, a suitable bolt or cotter pin should be employed in connection with each bracket 17 to lock the bar 16 in place. Rotatably secured upon the cylindrical bar 16 are two scrapers, one opposite each wheel 15. Each scraper comprises a sleeve member 20 that surrounds the bar 16, and is rotatable within certain limits thereon. It is held in position upon the bar by a cotter pin or bolt that passes through a hole in the bar 16 and through slots in the front and rear of the sleeve member 20. I prefer to provide a plurality of said holes in each end portion of the bar 16, in order that the scrapers may be adjusted to different positions to accord with the adjustment that may be made of the planter parts for different spacing of planting rows. The slots in the sleeve 20 are indicated by 22, and the cotter pin that passes through such slots and one of the holes 21 by 23. The slots 22 are to be of such length as to permit the scrapers 19 to be swung forward easily to insure their proper contact with the respective wheels 15.

The two scrapers are connected together by a cross-bar 24. Extending forward from this cross-bar is a link 28 which is attached at its forward end to a foot lever 29 that is pivoted at 30 to one of the castings on the main frame that serves as one of the bearings for the axle 12. This mechanism for operating the scrapers is not further described or illustrated more in detail, as it is not necessary to an understanding of the means for connecting and operating the marker arms, which means form the subject-matter of the claims appended hereto. Such scraper operating mechanism will form the basis for a separate application for patent.

As shown, the cylindrical scraper-carrying bar 16 has its ends projecting beyond the wheels of the planter, and to each end of such bar is rigidly secured a member 31 to which is attached one of the marker arms, and which serves not only as a support for such marker arm when in operation, but serves also as a guiding means against which the marker arm bears when being moved into operative or inoperative position. This member 31 has at its inner end a cylindrical portion 32 that fits snugly within one end of the bar 16, and is there held by a cotter pin 33 or by a rivet or any other suitable fastening device. The member 31 is in the form of a short arm that extends downwardly and rearwardly from the bar 16, the upper face thereof being curved as clearly shown in Fig. 3. The outer end of the member 31 is preferably thickened or enlarged as at 34, through which thickened portion or head is a vertical cylindrical passage in which is rotatably mounted one leg of a bent bolt that is substantially right angular in shape. This bolt is indicated by 35, and as shown it is held against withdrawal by a cotter pin 36. Upon the other leg of the bent bolt 35 is rotatably mounted one of the two marker arms that have been referred to, such two marker arms being each indicated by 37. Each marker arm lies over and in contact with the upper curved surface of the adjacent supporting member 31, and the substantially horizontal portion of the bolt 35 passes through an opening near the inner end of the marker arm, and is held thereon by a cotter pin 38, the arm being free to rock on such bolt.

39 indicates the usual flexible connection, preferably a rope, that connects the outer ends of the two marker arms as usual, such connection passing over or around guides 40 of any usual type and being of such length as to cause one of the marker arms to be held in inoperative position when the other arm is extended laterally from the machine, as is well understood. The outer end of each marker arm will of course be provided with an earth-marking member of any desired construction.

By connecting each marker arm with the planter by the means described, a construction is provided that permits the marker arm that is in use to freely rock on the substantially horizontal member of the angular bolt 35 and at the same time the swiveling of the other leg of the bolt in the head 34 permits the necessary slight play of the arm in the other direction. Also it is to be noted that when one of the marker arms is to be drawn up alongside of the machine out of operative position and the other marker arm at the same time moves into operative position, such movements of the arms are so guided by the curved and comparatively smooth upper surface of the member 31 that these movements will be accomplished very easily and with practically no liability whatever of any sticking or binding of the parts,— the vertical legs of the bolts freely turning of course in the bearings that are furnished them by the enlarged heads 34 in which they are respectively mounted.

By rigidly securing the scraper-carrying bar 16 to the planter frame instead of having it rotatable, I am able to movably connect the marker arms to the planter by the exceedingly simple means that have been described; viz: the curved members 31 and the angular bolts 35, whereas if such bar 16 were made rotatable and with the scrapers rigidly attached thereto so as to turn therewith, the marker arms necessarily could not be connected up with as simple means as those described. While I have shown each marker arm provided with but a single opening for engagement by the horizontal leg of the bolt 35, it will of course be understood that each arm may have a number of such openings spaced a distance apart, through any one of which such leg of the bolt may pass and thereby the operative length of the marker arm be regulated so as to make the desired mark on the earth at the desired distance away from the machine.

What I claim as new and desire to secure by Letters Patent is:

1. The combination with a planter-frame, of a transversely-arranged bar at the rear thereof and non-rotatably secured thereto, a member fixedly secured to one end of said bar and extending outwardly, downwardly and rearwardly from said bar, and a marker-arm overlying said member and movably attached thereto and adapted by contact with the upper surface of said member to be guided into and out of operative position.

2. The combination with a planter-frame, of a transversely-arranged bar at the rear thereof and non-rotatably secured thereto, a member fixedly secured to one end of said bar and extending outwardly, downwardly and rearwardly from said bar, and a marker-arm overlying said member, said marker-arm being pivotally connected at a distance from its inner end with the lower end portion of said member and adapted by contact with the upper surface of said member to be guided into and out of operative position.

3. The combination with a planter-frame, of a transversely-arranged bar at the rear thereof and non-rotatably secured thereto, a member fixedly secured to one end of said bar and extending outwardly, downwardly and rearwardly from said bar, a bolt of substantially right-angle shape having one leg thereof rotatably secured in the outer end portion of said member, and a marker-arm overlying said member and rotatably secured upon the other leg of said bolt.

4. The combination with a planter-frame, of a transversely-arranged bar at the rear thereof and non-rotatably secured thereto, a member fixedly secured to one end of said bar and extending outwardly, downwardly and rearwardly from said bar and having a curved upper surface, a bolt of substantially right-angle shape having one leg thereof secured in the outer end portion of said member, and a marker-arm overlying said member and rotatably secured upon the other leg of said bolt and adapted to be in contact with and guided by said curved upper face when moving into both operative and inoperative positions.

ERNST E. ENGLUND.